United States Patent
Wang et al.

(10) Patent No.: US 10,840,992 B2
(45) Date of Patent: Nov. 17, 2020

(54) USER EQUIPMENT, RADIO NETWORK NODE AND METHODS PERFORMED THEREIN FOR HANDLING COMMUNICATION IN A WIRELESS COMMUNICATION NETWORK

(71) Applicant: Telefonaktiebolaget LM Ericsson (publ), Stockholm (SE)

(72) Inventors: Min Wang, Luleå (SE); Jan Christoffersson, Luleå (SE); Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/325,160

(22) PCT Filed: Dec. 23, 2018

(86) PCT No.: PCT/SE2018/051364
§ 371 (c)(1),
(2) Date: Feb. 12, 2019

(87) PCT Pub. No.: WO2019/139526
PCT Pub. Date: Jul. 18, 2019

(65) Prior Publication Data
US 2020/0052767 A1 Feb. 13, 2020

(30) Foreign Application Priority Data
Jan. 10, 2018 (WO) ................ PCT/CN2018/072037

(51) Int. Cl.
*H04B 7/06* (2006.01)
*H04W 48/06* (2009.01)
(Continued)

(52) U.S. Cl.
CPC .......... *H04B 7/0695* (2013.01); *H04W 48/06* (2013.01); *H04W 74/006* (2013.01); *H04W 74/02* (2013.01); *H04W 74/0833* (2013.01)

(58) Field of Classification Search
None
See application file for complete search history.

(56) References Cited

U.S. PATENT DOCUMENTS

2018/0020486 A1* 1/2018 Yano ................ H04W 72/0486
2018/0035469 A1* 2/2018 Chen .................... H04W 72/10
(Continued)

FOREIGN PATENT DOCUMENTS

WO 2019032001 A1 2/2019

OTHER PUBLICATIONS

Huawei et al., "R2-1705190: Rach Backoff," 3GPP TSG-RAN WG2 #98, May 15-19, 2017, Hangzhou, China, 3 pages.
(Continued)

*Primary Examiner* — Rebecca E Song
(74) *Attorney, Agent, or Firm* — Withrow & Terranova, PLLC

(57) ABSTRACT

Embodiments herein relate to a method performed by a user equipment for handling communication in a wireless communication network. The user equipment receives a RAR comprising an indicator indicating a load of a beam from the radio network node. The user equipment further transmits a preamble in a selected beam selected based on the indicator.

18 Claims, 13 Drawing Sheets

(51) Int. Cl.
*H04W 74/00* (2009.01)
*H04W 74/02* (2009.01)
*H04W 74/08* (2009.01)

(56) References Cited

U.S. PATENT DOCUMENTS

2018/0317264 A1* 11/2018 Agiwal ................. H04W 52/36
2019/0059113 A1* 2/2019 He ..................... H04W 74/0875
2019/0208547 A1* 7/2019 Koskela ............... H04B 7/0617

OTHER PUBLICATIONS

Huawei et al., "R2-1709256: Solution of RACH backoff differentiation," 3GPP TSG-RAN WG2 Meeting #99, Aug. 21-25, 2017, Berlin, Germany, 3 pages.
International Search Report and Written Opinion for International Patent Application No. PCT/SE2018/051364, dated Mar. 7, 2019, 16 pages.
Author Unknown, "Technical Specification Group Radio Access Network; NR; Medium Access Control (MAC) protocol specification (Release 15)," Technical Specification 38.321, Version 1.1.0, 3GPP Organizational Partners, Nov. 2017, 64 pages.

* cited by examiner

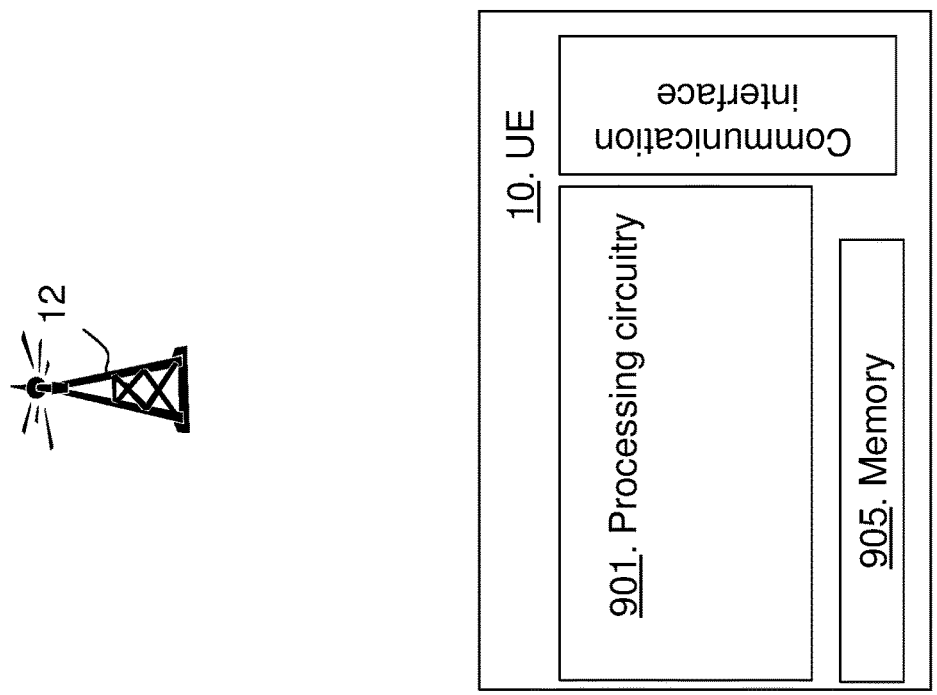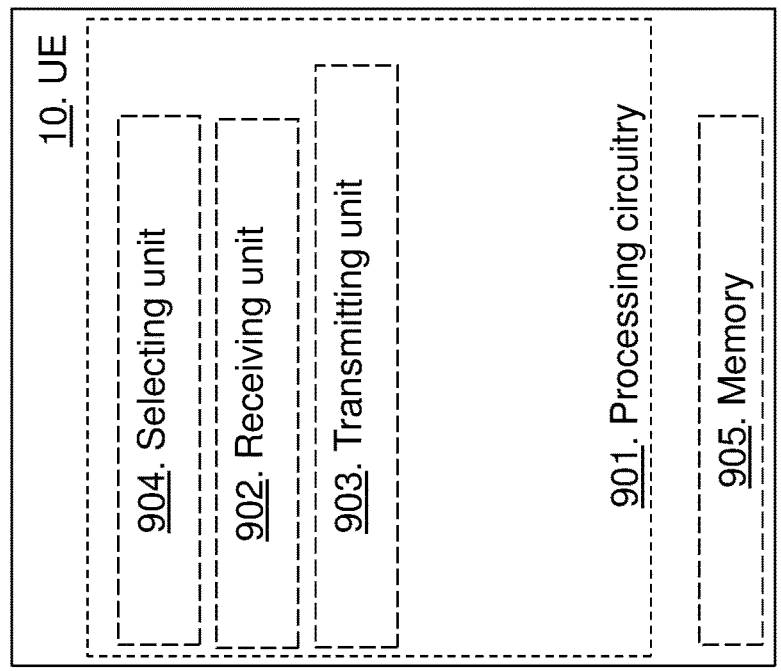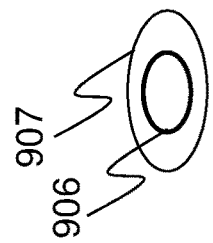
Fig. 9

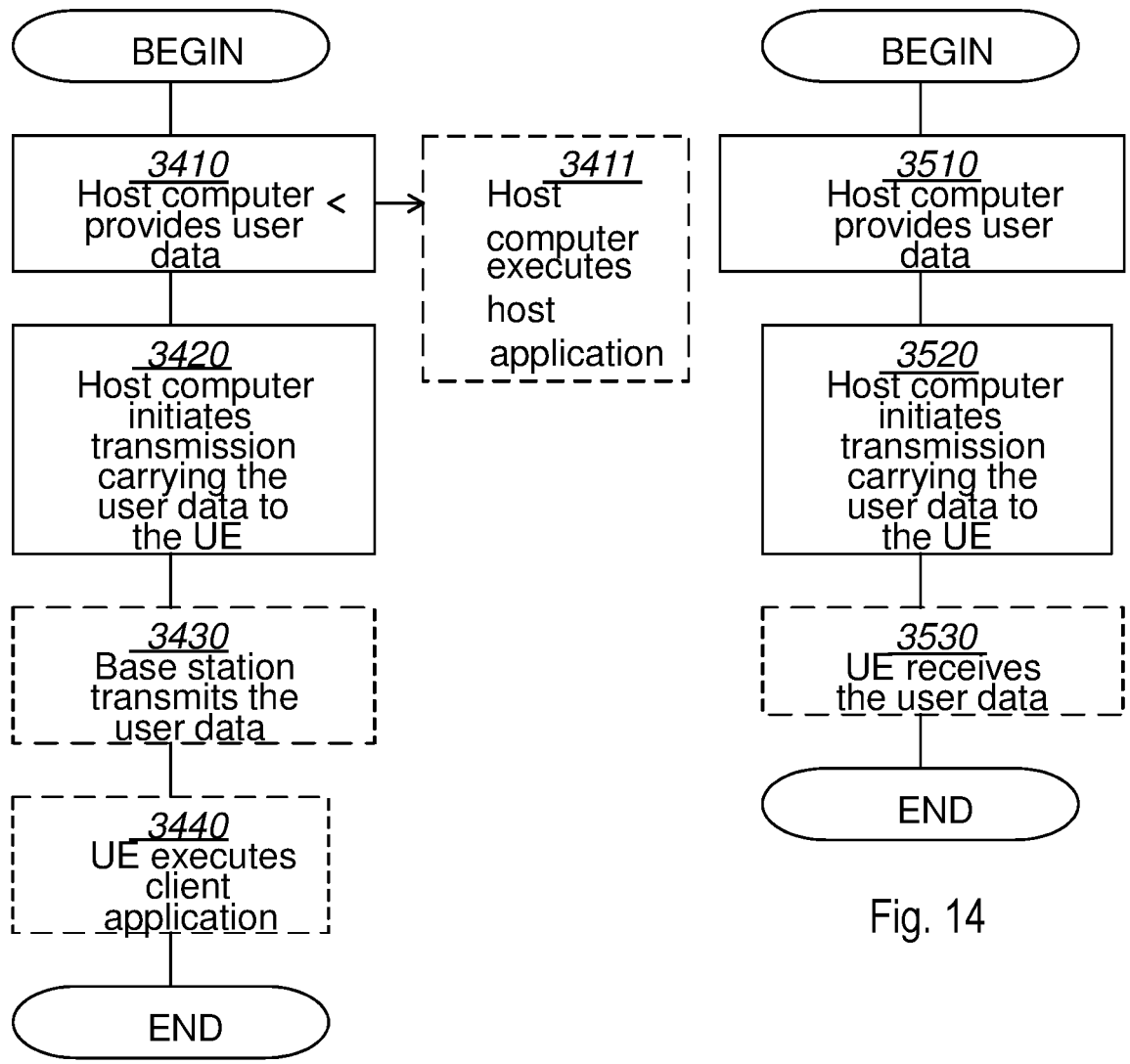

USER EQUIPMENT, RADIO NETWORK NODE AND METHODS PERFORMED THEREIN FOR HANDLING COMMUNICATION IN A WIRELESS COMMUNICATION NETWORK

This application is a 35 U.S.C. § 371 national phase filing of International Application No. PCT/SE2018/051364, filed Dec. 23, 2018, which claims the benefit of International Application No. PCT/CN2018/072037, filed Jan. 10, 2018, the disclosures of which are incorporated herein by reference in their entireties.

TECHNICAL FIELD

Embodiments herein relate to a user equipment (UE), a radio network node and methods performed therein regarding wireless communication. In particular, embodiments herein relate to handling communication of the UE in a wireless communication network. Handling communication means e.g. enabling access to the wireless communication network, enabling communication, handling random access responses (RAR) or similar.

BACKGROUND

In a typical wireless communication network, UEs, also known as wireless communication devices, mobile stations, stations (STA) and/or wireless devices, communicate via a radio access network (RAN) to one or more core networks (CN). The RAN covers a geographical area which is divided into service areas, also referred to as cell areas, with each service area being served by a radio network node e.g., a Wi-Fi access point or a radio base station (RBS), which in some networks may also be called, for example, a gNodeB, a NodeB or an eNodeB. The service area is a geographical area where radio coverage is provided by the radio network node. The radio network node operates on radio frequencies to communicate over an air interface with one or more UEs within range of the radio network node. The radio network node communicates over a downlink (DL) to a UE and the UE communicates over an uplink (UL) to the radio network node.

A Long time evolution (LTE) random access (RA) procedure comes in two forms, allowing access to be either contention-based that implies an inherent risk of collision, or contention-free. In contention-based random access, a preamble sequence is randomly chosen by the UE, which may result in that more than one UE simultaneously transmits the same signature, which leads to a need for a subsequent contention resolution process.

The contention-based random access procedure, shown in FIG. 1, comprises four steps:
1. Preamble transmission;
2. Random access response transmission;
3. Transmission of message 3 (MSG3);
4. Contention resolution message.

Preamble transmission: The UE selects one of a set of sequences e.g. 64-Z physical random access channel (PRACH) contention-based sequences, wherein Z is the number of sequences allocated, by the radio network node, for contention-free preambles. The set of contention-based sequences, also referred to as signatures, is further subdivided into two subgroups, so that the choice of preamble can carry one bit of information relating to the amount of transmission resource needed to transmit Message 3. The broadcast system information indicates which sequences are in each of the two subgroups, each subgroup corresponding to one value of the one bit of information, as well as the meaning of each subgroup. The UE selects a sequence from the subgroup corresponding to a size of transmission resource needed for the appropriate Random Access Channel (RACH) use case. It should be noted that some use cases require only a few bits to be transmitted in MSG3, so choosing the small message size avoids allocating unnecessary uplink resources, such as time and/or frequency.

Random Access Response (RAR): The RAR conveys the identity of the detected preamble called random access preamble identity (RAPID), a timing alignment instruction to synchronize subsequent uplink transmissions from the UE, an initial uplink resource grant for transmission of the Step 3 message, and an assignment of a temporary Cell radio network temporary identifier (T-C-RNTI), which may or may not be made permanent as a result of the next step called contention resolution. The RAR may also be scrambled with a random access radio network temporary identifier (RA-RNTI) when the RAR was detected and indicates the physical random access channel (PRACH) resource when the preamble was transmitted. The UE expects to receive the RAR within a time window, of which time window the start and end are configured by the radio network node and broadcast as part of the cell-specific system information. If the UE does not receive a RAR within the configured time window, it selects another sequence or preamble to be transmitted again.

Message 3 transmission: This message is the first scheduled uplink transmission on the physical uplink shared channel (PUSCH) and makes use of hybrid automatic repeat request (HARQ). It is addressed to the T-C-RNTI allocated in the RAR. In case of a preamble collision having occurred at Step 1, the colliding UEs will receive the same T-C-RNTI through the RAR and will also collide in the same uplink time-frequency resources when transmitting their layer 2 (L2) and/or layer 3 (L3) messages. This may result in such interference that no transmissions from colliding UEs can be decoded, and the UEs restart the random access procedure after reaching the maximum number of HARQ retransmissions. However, if a transmission of one UE is successfully decoded, the contention remains unresolved for the other UEs. The following downlink message, in Step 4, allows a quick resolution of this contention.

Contention-resolution: The contention resolution message uses HARQ. It is addressed to the C-RNTI, if indicated in the MSG.3 message, or to the T-C-RNTI, and, in the latter case, echoes the UE identity contained in MSG.3. In case of a collision followed by successful decoding of the MSG.3, the HARQ feedback is transmitted only by the UE which detects its own UE identity (or C-RNTI); other UEs understand there was a collision, transmit no HARQ feedback, and can quickly exit the current random access procedure and start another one.

The evolving 5G standard New Radio (NR) is aiming to operate in a wide range of frequencies from below 1 GHz up to 100 GHz. In such a frequency range, the random access procedure in NR may be improved to mitigate the potential propagation losses at high frequency carriers. In NR, there is a necessity to transmit on one or multiple downlink beams. The UE can indicate through the preamble transmission which beam it prefers by measuring downlink signal strength on the different beams being associated with synchronization signal blocks (SSB) e.g. measuring synchronization signal-reference signal received power (SS-RSRP).

The SSBs are broadcasted and available for all UEs, including idle UEs, so the best DL beam can be identified for the initial access to the system.

The UE indicates the preferred, or best in terms of signal strength or quality, DL beam by utilizing a mapping from SS-blocks to a set of random access channel (RACH) preambles and/or physical random access channel (PRACH) resources such as time and frequency. A maximum number of SS-blocks, L, depends on the carrier frequency according to agreements in 3GPP RAN1#89:

The transmission of SS blocks within a SS burst set is confined to a 5 ms window regardless of SS burst set periodicity;

Within this 5 ms window, number of possible candidate SS block locations is L; and The maximum number of SS-blocks within SS burst set, L, for different frequency ranges are For frequency range up to 3 GHz, L is 4

For frequency range from 3 GHz to 6 GHz, L is 8

For frequency range from 6 GHz to 52.6 GHz, L is 64

Note that RAN1 assumes minimum number of SS blocks transmitted within each SS burst set is one to define performance requirements The number of configured RACH preambles in each cell was 64 in LTE. These NR-RACH preambles are shared between contention based and non-contention based accesses. For NR, it has been agreed that the number of PRACH preambles per RACH occasion (RO) is not more than 64.

The selection of SSB is left to the UE as long as it selects an SSB with an SS-RSRP above a threshold denoted ssb-Threshold. Hence, the UE is not forced to choose the SSB with highest SS-RSRP.

After transmitting the preamble, the UE monitors the downlink physical control channel (DPCCH) scrambled by the RA-RNTI during the RAR window. This means that all UEs transmitting a preamble in the same RACH opportunity, i.e. same time and frequency, will have the same RA-RNTI and will monitor its RAR in the same RAR window. If the UE does not receive a response from the radio network node for its preamble transmission, it may retry up to a maximum number of PRACH preamble transmissions given by a parameter denoted ra-PreambleTx-Max. If the UE does not receive a response after ra-PreambleTx-Max transmissions, the UE will indicate a Random Access problem to upper layers.

In case there is a high load in either a particular beam, or if the radio network node has difficulties to handle all RA attempts it may indicate a backoff via a RA response message. The terms backoff, back off and back-off may be interchangeably used. The backoff is signaled by a backoff indicator (BI) in e.g. a RAR MAC subheader, see FIG. 2, taken from 3GPP TS 38.321 v1.1.0. R means reserved bit, E means extension indicating if there is another field following the subheader or not, and T indicates if resources are in the payload of the RAR. The BI is a value indicating to the UE how long to wait until it retransmits PRACH using a randomly selected preamble, UE waits a random time between 0 and BI value ms. Before transmitting a (new) preamble, the UE undergoes a random access resource selection procedure. In this step, the UE has the option to select or reselect any beam which has a SS-RSRP above a configured ssb-Threshold. In case there is more than one SSB, i.e. beam, fulfilling this criterion, the UE may change to a different beam than that was used for the previous preamble transmissions.

SUMMARY

For a cell, e.g. an NR cell, configured with multiple beams, each identified by a SSB, i.e. each SSB is associated with a specific DL beam, the choice of which SSB to use is left to UE implementation as long as it selects an SSB with an SS-RSRP above the ssb-Threshold.

This may lead to a RA performance degradation for the initial RACH access in case an unequal RA load occurs in different beam areas. For initial RACH accesses, the measurement metric of SS-RSRP, or reference signal received quality (RSRQ) such as signal to interference plus noise ratio (SINR), that is used for the beam selection may not reflect the RA load situation of the corresponding beams, e.g. whether the selected beam is congested or not. Since the RA load between the different SSBs or between different SSB sets may be different, it may happen that the beam which is used for random access is experiencing high load, which results in that the radio network node sends a BI to the UE. At the same time, other beams or SSBs may experience low load and be able to handle the UEs RA. The current situation is that the UE will do backoff and retransmit preambles on the same SSB in this case, resulting in an unnecessary long delay for the RA. It is up to UE implementation on when to switch to other SSBs. It is not beneficial to latency sensitive services with such unpredicted UE behaviours.

RA performance degradation may further occur for urgent random access in connected state e.g. radio resource control (RRC) connected state. There are also some other cases where contention based RA is applied, the UE may have choices to choose appropriate beam for UL RACH wherein BI may block the urgent contention based random access such as:

Beam failure recovery, where the UE can choose appropriate beam, associated with an SSB, from multiple beams to perform recovery;

Radio connection re-establishment at radio link failure (RLF) or handover to a new cell, where the UE has multiple SSBs in the target cell fulfilling given criteria for RACH accesses.

Also for the both the above cases, the UE may receive a BI in the RAR after a preamble transmission on one beam, indicating a backoff on this beam, while the other beams may still not be fully loaded, and ok to accept more accesses.

An object of embodiments herein is to provide a mechanism that improves the performance of the wireless communication network when handling communication of a UE in the wireless communication network, e.g. handling random access when multiple beams, each associated with a SSB, are available.

According to an aspect the object is achieved by providing a method performed by a UE for handling communication in a wireless communication network. The UE receives a RAR of a random access procedure, wherein the RAR comprises an indicator, such as a BI, indicating a load of a beam associated with the RAR. The UE transmits a preamble in a selected beam, wherein the selected beam is selected based on the indicator.

According to another aspect the object is achieved by providing a method performed a radio network node for handling communication of a UE in a wireless communication network. The radio network node transmits configuration data to the UE, wherein the configuration data indicates whether the UE should skip backoff behaviour or not and thereby indicating whether the UE, without performing a backoff operation indicated in a RAR, should change beam to transmit a preamble on or not. E.g. the configuration data may indicate whether the UE should change, upon reception of an indicator, beam to transmit a preamble in or not. The radio network node may further transmit the indicator in the RAR indicating a load of a beam associated with the RAR.

According to yet another aspect the object is achieved by providing a UE for handling communication in a wireless communication network. The UE is configured to receive a RAR of a random access procedure, wherein the RAR comprises an indicator indicating a load of a beam. The UE is further configured to transmit a preamble in a selected beam, wherein the selected beam is selected based on the indicator.

According to still another aspect the object is achieved by providing a radio network node for handling communication of a UE in a wireless communication network. The radio network node is configured to transmit configuration data to the UE, wherein the configuration data indicates whether the UE should skip backoff behaviour or not and thereby indicating whether the UE, without performing a backoff operation indicated in a RAR, should change beam to transmit a preamble on or not.

It is furthermore provided herein a computer program product comprising instructions, which, when executed on at least one processor, cause the at least one processor to carry out any of the methods above, as performed by the radio network node or the UE, respectively. It is additionally provided herein a computer-readable storage medium, having stored thereon a computer program product comprising instructions which, when executed on at least one processor, cause the at least one processor to carry out the method according to any of the methods above, as performed by the radio network node or the UE, respectively.

Embodiments herein describe methods enabling the UE to react to the reception of the indicator such as a BI which indicates that the transmitting beam is being highly loaded, e.g. loaded above a threshold value. In the proposed UE actions, instead of performing the backoff on the beam where the preamble was transmitted, the UE can switch to another beam which has sufficiently good radio condition, e.g. signal strength or quality above a signal threshold. The UE may perform such BI skipping action for certain configured services or RACH access events after changing beams.

In this way, the random access load in different beams, also referred to as SSB beams, can be balanced from system perspective and the RACH delay can be reduced from an individual UE perspective. Thus, embodiments herein have an advantage to reduce the random access delay for a UE since a backoff behaviour is skipped and a preamble is transmitted on a different beam and this may also enable balancing traffic load between beams via beam selection or reselection upon the reception of the indicator.

BRIEF DESCRIPTION OF THE DRAWINGS

Embodiments will now be described in more detail in relation to the enclosed drawings, in which:

FIG. 9 is a block diagram depicting a UE according to embodiments herein;
FIG. 13 shows methods implemented in a communication system including a host computer, a base station and a user equipment in accordance with some embodiments;
FIG. 14 shows methods implemented in a communication system including a host computer, a base station and a user equipment in accordance with some embodiments.

DETAILED DESCRIPTION

Figure 1:
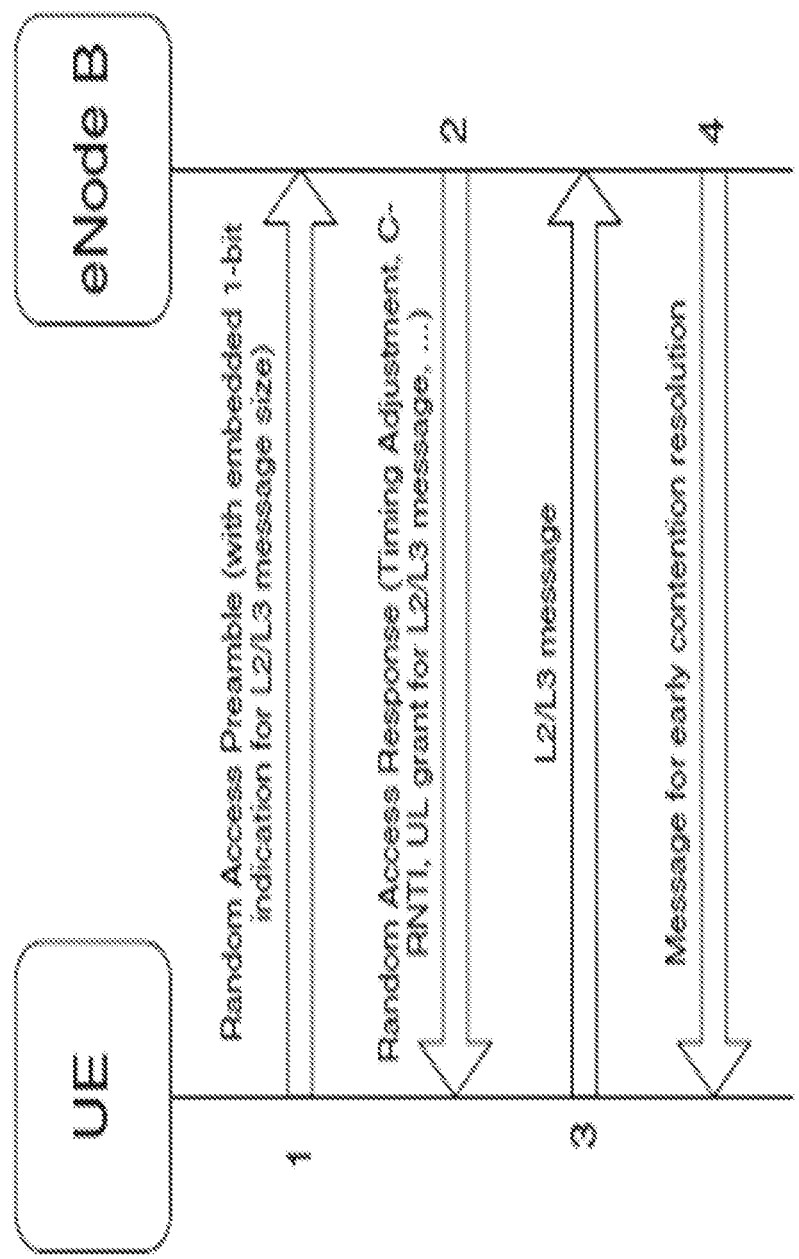
FIG. 1 shows an overview of the RA procedure in LTE.
Figure 2:
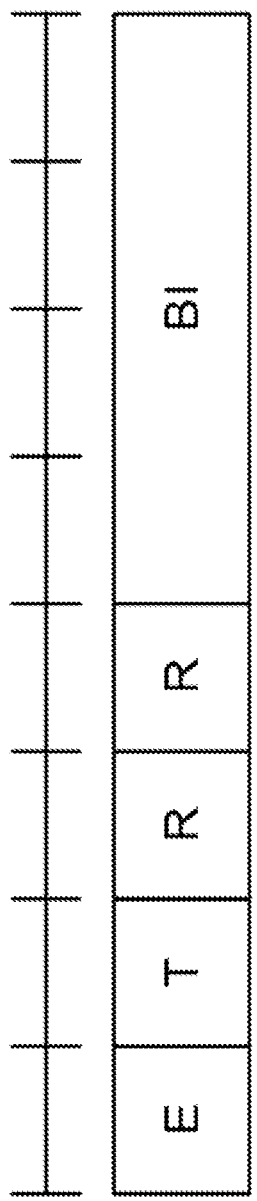
FIG. 2 shows an overview depicting a subheader.
Figure 3:
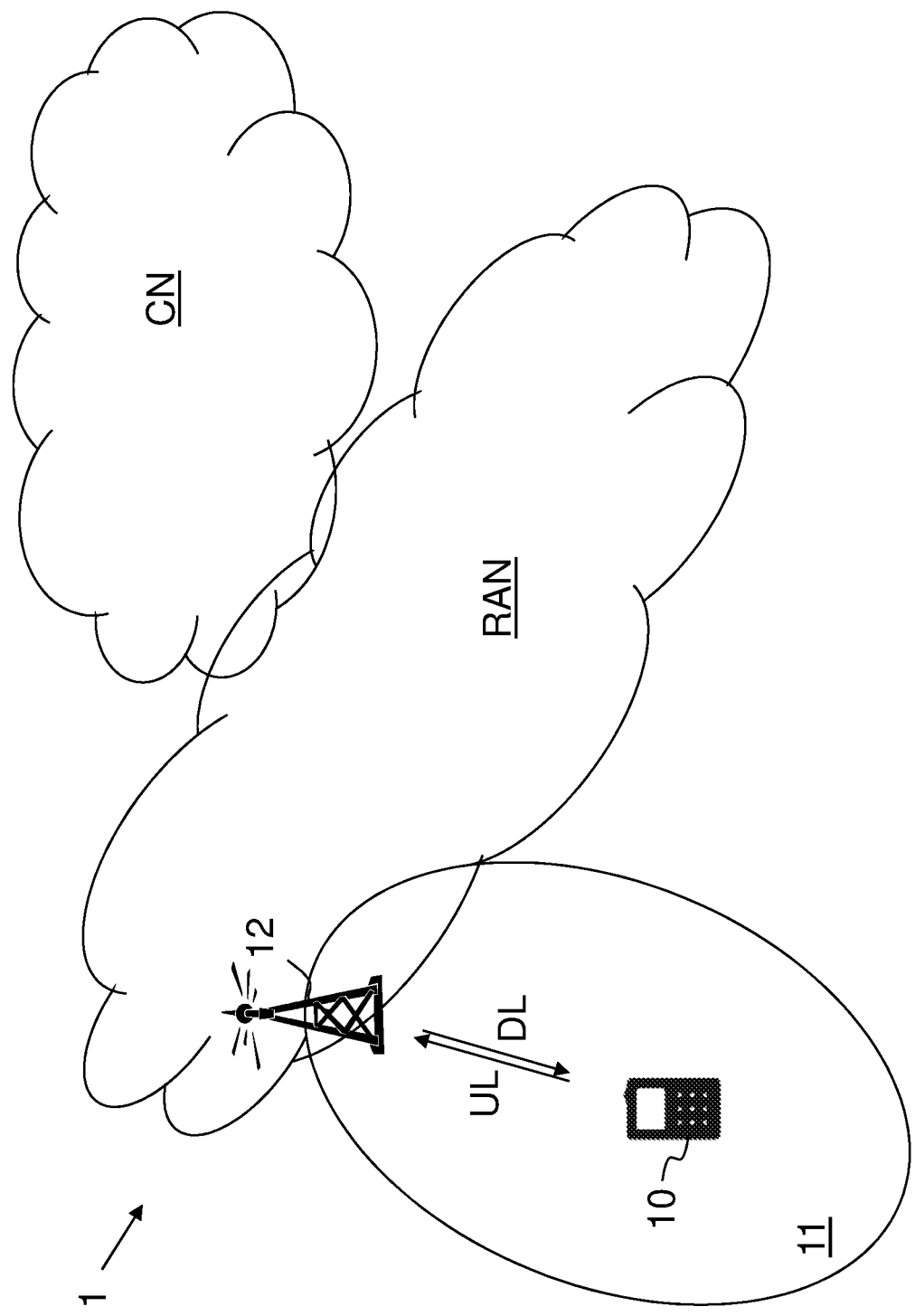
FIG. 3 is a schematic overview depicting a wireless communication network according to embodiments herein.

Embodiments herein relate to wireless communication networks in general. FIG. 3 is a schematic overview depicting a wireless communication network 1. The wireless communication network 1 comprises one or more RANs and one or more CNs. The wireless communication network 1 may use one or a number of different technologies. Embodiments herein relate to recent technology trends that are of particular interest in a 5G context such as NR, however, embodiments are also applicable in further development of existing wireless communication systems such as e.g. Wideband Code Division Multiple Access (WCDMA) and LTE.

In the wireless communication network 1, UEs e.g. a UE 10 such as a mobile station, a non-access point (non-AP) STA, a STA, a wireless device and/or a wireless terminal, communicate via one or more Access Networks (AN), e.g. RAN, to one or more core networks (CN). It should be understood by the skilled in the art that "UE" is a non-limiting term which means any terminal, wireless communication terminal, user equipment, Machine Type Communication (MTC) device, internet of things (IoT) operable device, Device to Device (D2D) terminal, or node e.g. smart phone, laptop, mobile phone, sensor, relay, mobile tablets or even a small base station capable of communicating using radio communication with a radio network node within an area served by the radio network node.

The wireless communication network 1 comprises a radio network node 12 providing radio coverage over a geographical area, a first service area 11, of a first radio access technology (RAT), such as NR, LTE, or similar. The radio network node 12 may be a transmission and reception point e.g. a radio network node such as a Wireless Local Area Network (WLAN) access point or an Access Point Station (AP STA), an access node, an access controller, a base station, e.g. a radio base station such as a gNodeB (gNB), an evolved Node B (eNB, eNode B), a base transceiver station, a radio remote unit, an Access Point Base Station, a base station router, a transmission arrangement of a radio base station, a stand-alone access point or any other network unit or node capable of communicating with a UE within the area served by the radio network node 12 depending e.g. on the first radio access technology and terminology used. The radio network node may be referred to as a serving radio network node wherein the first service area may be referred to as a serving cell, and the serving network node communicates with the UE 10 in form of DL transmissions to the UE 10 and UL transmissions from the UE 10. It should be noted that a service area may be denoted as a cell, beam, beam group or similar to define an area of radio coverage. The radio network node 12 transmits reference signals, such as SSBs or channel state information reference signal (CSI-RS), over the service area. Each SSB or CSI-RS being associated with a beam e.g. each SSB or CSI-RS is representing a respective beam. Hence, the radio network node 12, 13 transmits SSBs or CSI-RSs repeatedly, in time, in a large number of different directions using e.g. as many transmission-beams as deemed necessary to cover an operational area of the respective radio network node.

Embodiments herein enable the UE 10 to change beam of a random access procedure when indicated by an indicator, such as a backoff indicator, in a RAR of the random access procedure that the load of a beam is e.g. above a threshold. Beam may be referred to as SSB beam (or SSB beam set) or CSI-RS beam. Thus, the random access may continue to be performed on or in a different beam that is not as fully loaded. For beam reselection, embodiments herein may apply for SSB beam selection or reselection, and may also be applied for CSI-RS beam selection for random access. For simplicity beam as such is used in the description.

Figure 4:
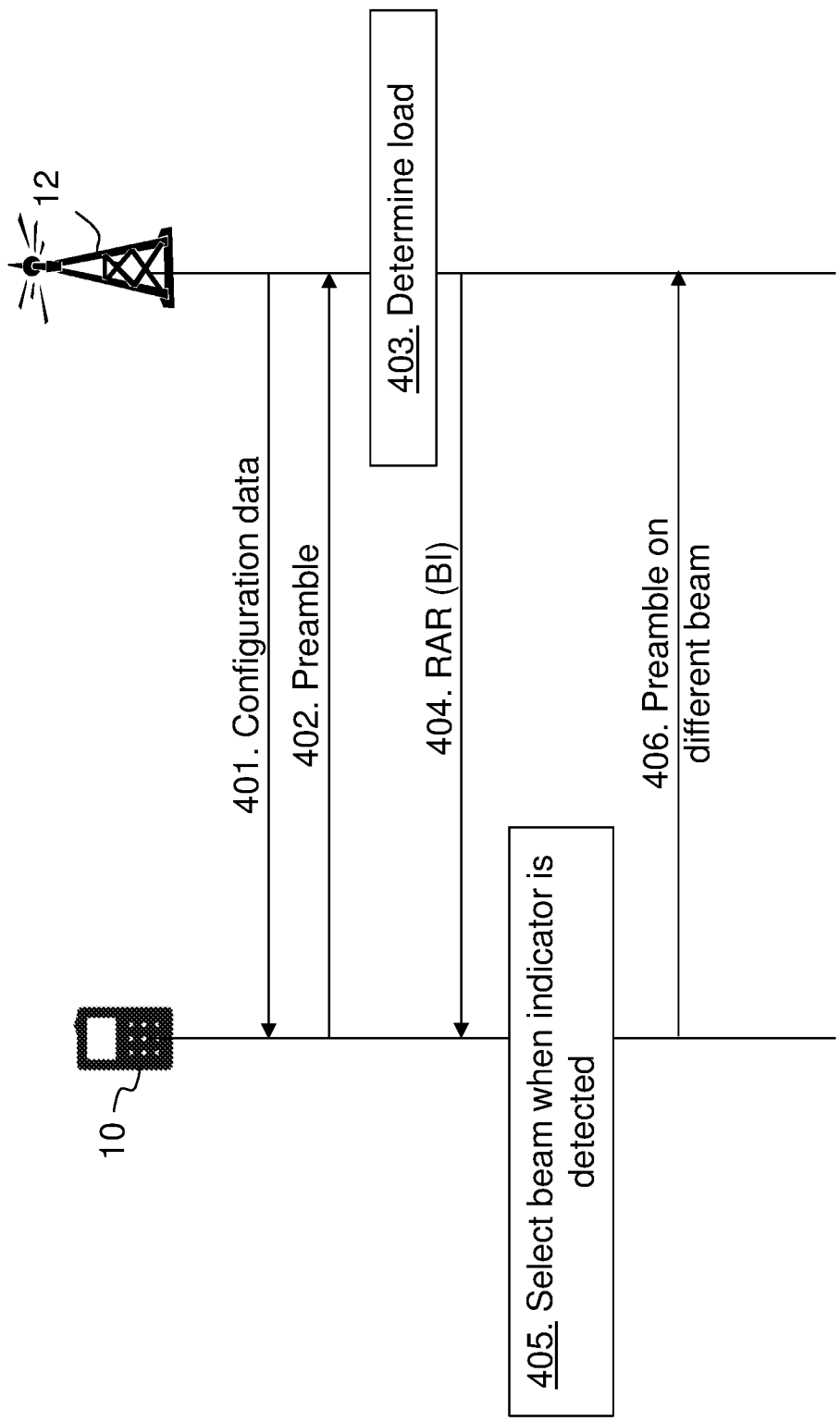
FIG. 4 shows a combined flowchart and signalling scheme according to embodiments herein.

FIG. 4 is a combined flowchart and signaling scheme according to embodiments herein.

Action 401. The radio network node 12 may configure the UE 10 by transmitting configuration data indicating whether the UE 10 should skip backoff behaviour or not. The configuration data may further indicate random access resources and similar. The configuration data may be transmitted in radio resource control (RRC) messages (or in the RAR shown in action 404).

Action 402. The UE 10 may transmit a preamble during a random access procedure. For the reason of clarity, the preamble in this action will also be called a first preamble, the beam herein used for transmitting this first preamble will also be referred to as a first beam. The UE 10 may select one out of e.g. 64-Z PRACH contention-based sequences, where Z is a number of contention-free preambles allocated by the radio network node 12. The set of contention-based sequences may further be subdivided into two subgroups, so that the choice of preamble (i.e. sequence) can carry one bit of information relating to the amount of transmission resource needed to transmit the Message 3.

Action 403. The radio network node 12 may determine a load of one or more beams comprising the beam used by the UE 10 for transmitting the preamble. E.g. the load may be estimated based on a number or a percentage of occupied preambles, based on a number of PRACH retransmissions, a time taken to finish a RA procedure, and/or an uplink received signal strength at the radio network node 12, etc., and measurements may be per SSB.

Action 404. The radio network node 12 responds to the UE 10 with the RAR. The RAR carries the indicator, such as a BI, indicating the load on the beam of the received preamble, e.g. indicating that the load is above a threshold. Embodiments herein may thus disclose that the indicator indicating that a beam has high load is sent to the UE 10. This may be done by transmitting the BI in the RAR. When the UE 10 receives the BI in the RAR after a preamble transmission in one beam, this means that the beam where the preamble was transmitted is experiencing high load. This mechanism may be done more detailed so that a BI value above a given threshold that is configured by the radio network node 12, means that the corresponding beam is overloaded. The radio network node 12 may further configure multiple BI thresholds to indicate different load situations. As another option, the thresholds could be pre-stored in the UE 10. Thus, a first BI value may indicate a first load level and a second BI value may indicate a second load level.

There may be other options to indicate a beam specific load. One option is that the radio network node broadcast an SSB, or SSB set, specific load indicator in the system information (SI), wherein the load indicator may only be broadcasted in one or more beams or in all SSB beams. Another option is that the radio network node 12 may add additional load indicator in the RAR, MAC control element (CE) or use downlink control indicator (DCI) to carry additional load indicator for each beam.

Action 405. The UE 10 may then select another beam (or SSB) when the indicator is detected in the RAR. The UE 10 may select the other beam based on signal strength or quality measured on reference signals of respective beam. Thus, the UE 10 may select the beam candidates for RACH in terms of other metrics such as RSRQ, SINR especially when the UE 10 performs RACH access in RRC connected state.

Action 406. The UE 10 then transmits a preamble, e.g. the previous first preamble or another preamble, on the selected beam. The selected beam is selected based on the indicator or the indicator is taken into account. Thus, the random access may continue to be performed on or in a different beam that is not as fully loaded as the first beam used for transmitting the first preamble.

For example, when the UE 10 receives the indicator such as the BI (and optionally the indicated backoff values is above a given threshold), the UE 10 checks if there are other candidate beams whose e.g. SS-RSRPs are above the threshold such as ssb-Threshold, e.g. a rsrp-ThresholdSSB. If this is the case, the UE 10 ignores the BI, e.g. the UE 10 may set a timer denoted as PREAMBLE_BACKOFF to 0 ms. The UE 10 then proceeds with Random Access Resource selection from the set of usable beams or SSBs with the previously used beam or SSB excluded. The set of useable SSBs have the SS-RSRP measurements above the threshold. The procedure may repeat until the UE 10 gets the RAR indicating a success of a RACH access.

In some embodiments, upon reception of the indicator in the RAR, and optionally the indicated backoff value is above a given threshold, the UE behaviour to skip the BI on the currently used beam, and switch to the other beam, may be configured by the radio network node 12 for specific RACH access events, or specific services which trigger the RACH access. This may be e.g. due to the arrival of new data with predefined logical channel ID, or Logical channel group, or predefined quality of service class indicator (QCI) classes, or channel quality indicators (CQI) values. Thus, RACH access events may be transmission of UL data, a handover, or an initial access, and services may be transmissions of data with a set priority. This may thus be for RACH events and/or services that are sensitive for latencies and need a quick access to the wireless communication network. For other RACH events or services, the ordinary RACH procedure is followed, that is, follow the BI and transmit the preamble or another preamble in the currently used beam but at a delayed time.

Figure 5:
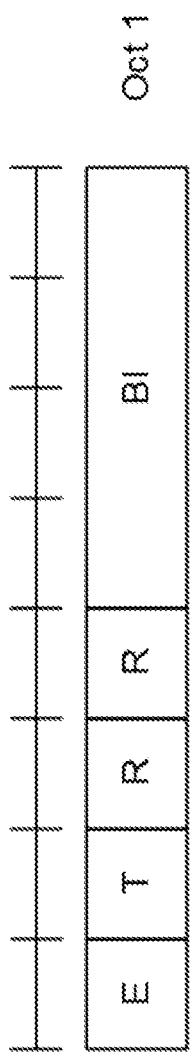
FIG. 5 shows an overview depicting a subheader.

In action 401, the configuration data may be signalled by the radio network node 12 to the UE 10 via system information, dedicated RRC signalling, MAC CE, or DCI. Alternatively or additionally, the configuration data may be signalled by the radio network node 12 to the UE 10 via the RAR, see action 404. Furthermore, the transmission of the configuration data may be a dynamic signaling of BI skipping using e.g. the RAR. The skipping of the backoff behavior may alternatively be dynamically signaled by the radio network node 12 via another indicator in a MAC subheader of the RAR. This can be achieved by utilizing at least one of the reserved bits (R fields) in octet (Oct) 1 shown in FIG. 5. An example is given in FIG. 6, where the first R bit is set to 0 if the legacy backoff procedure is used, i.e. follow BI and delay transmission of preamble on the same beam, and the R bit is set to 1 to indicate to the UE 10, if the UE is allowed, to ignore the BI according to embodiments herein and transmit preamble of a different beam without delay.

Figure 6:
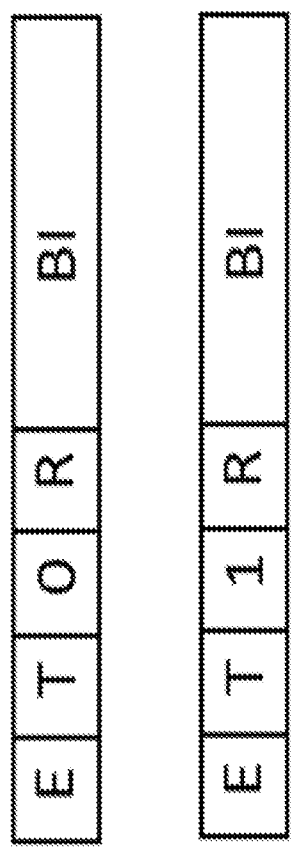
FIG. 6 shows an overview depicting a subheader according to embodiments herein.

Thus, FIG. 6 shows an example to use a single R bit in RAR subheader of the configuration data to indicate a conditional BI skipping i.e. skip the backoff behaviour 0—conditional BI skipping is not allowed for all UEs served by the beam (or beam set) thus providing better backward compatibility to the existing spec,
  1—conditional BI skipping is allowed for all UEs served by the beam (or beam set).

In another option, the proposed procedure and the BI skipping can be dynamically signaled using two R bits in the MAC sub-header, of the configuration data, the combination of two R bits are able to indicate more information such as RACH access events, Priorities of services etc. One example is given as below:

'RR'=00, all the PRACH retransmissions for all RA triggers shall perform backoff following the received BI value and transmit on the same beam;
  'RR'=01, for initial access, UEs in the access class 11 to 15, such as emergency services, security services etc., are assigned with high priority can perform the proposed UE action, i.e. skip backoff behaviour and transmit on another beam, upon reception of a BI e.g. with the value above a given threshold;
  'RR'=10, for RACH access events including handover, or RRC re-establishment, the UE can perform the proposed UE action, i.e. skip backoff behaviour and transmit on another beam, upon reception of a BI e.g. with the value above a given threshold;
  'RR'=11, for RA events triggered by the new data, if the new data has a configured QCI equal to 3, 65, 69, 75, or 79 thus indicating services requiring low latencies wherein these QCIs represent services such as real time gaming, vehicle to anything (V2X) messages; mission critical user plane push to talk (MCPTT) voice, etc., the UE can perform the proposed UE action, i.e. skip backoff behaviour and transmit on another beam, upon reception of a BI e.g. with the value above a given threshold.

The 'RR' value to the BI exemption case mapping can be either predefined in spec or configurable via RRC message. If it is configurable, a standard specification may define several candidate mapping policies and a special indicator may be defined to indicate which policy shall be applied for a UE, or the radio network node 12 can explicitly configure the mapping between 'RR' value and BI exemption case(s).

It is discussed mechanisms to differentiate RACH parameters for RACH accesses with different priorities. There is one issue discussed concerning on how to set BI settings differently considering the RACH access priorities. With differentiated BI settings, while keeping preamble transmission on the beam which is already overloaded, the UE just makes the congested beam to be even more congested. Thus, Random Access is a main function of the Medium access control (MAC) protocol. A backoff indicator may be sent in the random access response message to make the UE wait before re-transmitting the preamble. The UE behaviour can be improved when multiple beams are available.

Figure 7:
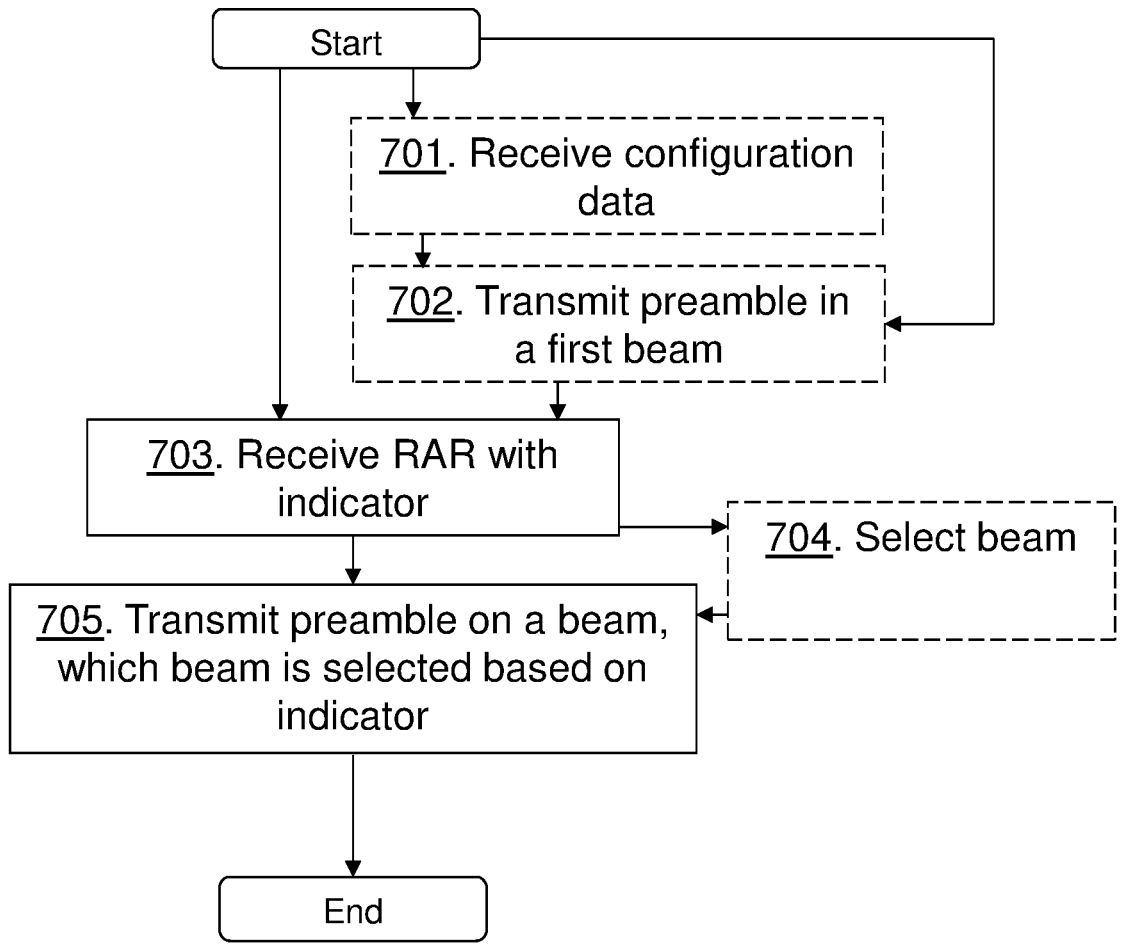
FIG. 7 shows a schematic flowchart depicting a method performed by a UE according to embodiments herein.

The method actions performed by the UE 10 for handling communication in the wireless communication network 1 according to embodiments will now be described with reference to a flowchart depicted in FIG. 7. The actions do not have to be taken in the order stated below, but may be taken in any suitable order. Actions performed in some embodiments are marked with dashed boxes.

Action 701. The UE 10 may receive configuration data indicating whether the UE 10 should skip backoff behaviour or not, wherein skipping backoff behaviour means transmitting the preamble on the selected beam, which selected beam is different than the beam of the RAR without performing a backoff operation indicated in the RAR. The configuration data may be indicating whether the UE 10 should skip backoff behaviour or not for specific RACH access events, or specific services which trigger the RACH access. The configuration data may be indicated by a value of one or two bits.

Action 702. The UE 10 may transmit the preamble in a beam, e.g. the first beam, during the random access procedure. The UE 10 may thus transmit the first preamble in the first beam during the random access procedure, wherein the first beam is different than the selected beam when the indicator in the RAR indicates that the load of the first beam is above a threshold.

Action 703. The UE 10 receives the RAR of the random access procedure, wherein the RAR comprises the indicator indicating the load of the beam. The indicator may be an indication that the load is above the threshold and the indicator may be a backoff indicator. It should be noted that the configuration data may be transmitted in the RAR from the radio network node 12.

Action 704. The UE 10 may select beam based on the indicator e.g. the indicator indicates that the UE 10 should select a different beam than the one previously used thus the indicator is taken into account when deciding whether to select a different beam or not. The UE 10 may select the different beam to use than the first beam based on measured signal strength or quality of beams.

Action 705. The UE 10 then transmits a preamble, e.g. the previously transmitted first preamble or another preamble, in the selected beam, wherein the selected beam is selected based on the indicator.

Figure 8:
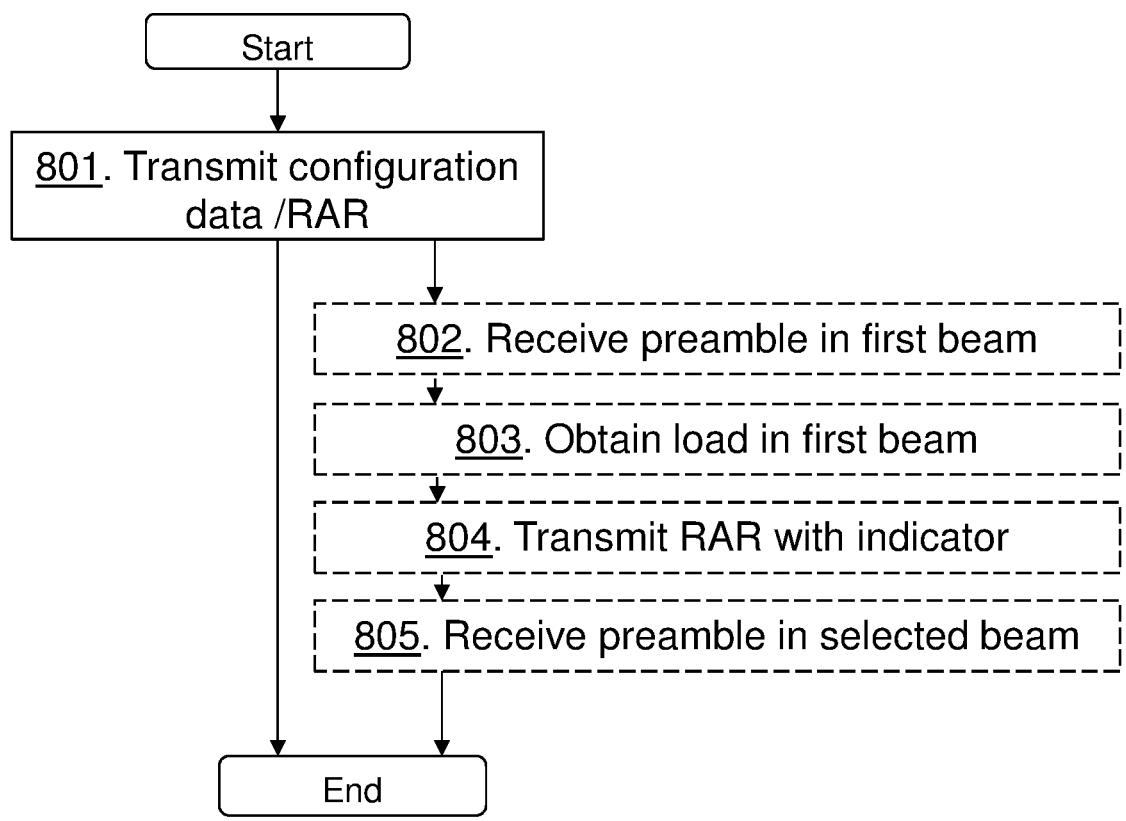
FIG. 8 shows a schematic flowchart depicting a method performed by a radio network node according to embodiments herein.

The method actions performed by the radio network node 12 for handling communication of the UE 10, e.g. handling access procedure from the UE 10, in the wireless communication network 1 according to embodiments will now be described with reference to a flowchart depicted in FIG. 8. The actions do not have to be taken in the order stated below, but may be taken in any suitable order. Actions performed in some embodiments are marked with dashed boxes.

Action 801. The radio network node 12 transmits configuration data, e.g. in the RAR or SI, to the UE 10, wherein the configuration data indicates whether the UE 10 should skip backoff behaviour or not and thereby indicating whether the UE 10, without performing the backoff operation indicated in the RAR, should change beam to transmit a preamble on or not. The RAR may comprise the indicator as well. Thus, the configuration data may be signaled in the RAR of a random access procedure. The configuration data may be transmitted for specific RACH access events, or specific services which trigger the RACH access. The configuration data may be indicated by a value of one or two bits.

Action 802. The radio network node 12 may receive the preamble from the UE 10. Thus, the radio network node 12 may receive the first preamble from the UE 10 in the first beam during the random access procedure.

Action 803. The radio network node 12 may further obtain the load of the first beam served by the radio network node 12. E.g. based on numbers of served UEs or amount of radio resources available the radio network node 12 may determine the load to be above the threshold.

Action 804. The radio network node 12 may further transmit the RAR comprising the indicator indicating the obtained load of the first beam. E.g. the radio network node 12 may transmit the RAR with the BI.

Action 805. The radio network node 12 may further receive the first preamble or another preamble in the selected beam, being another beam than the first beam, thus the selected beam may be a different beam than the first beam. The radio network node 12 may then transmit another RAR indicating successful RACH.

FIG. 9 is a block diagram depicting the UE 10 for handling communication in the wireless communication network according to embodiments herein.

The UE may comprise processing circuitry 901, such as one or more processors, configured to perform methods herein.

The UE 10 may comprise a receiving unit 902, e.g. a receiver, a transceiver or module. The UE, the processing circuitry 901, and/or the receiving unit 902 is configured to receive the RAR of a random access procedure, wherein the RAR comprises the indicator such as the BI indicating the load of the beam. The indicator may be an indication that the load is above the threshold and the indicator may be a backoff indicator. The UE, the processing circuitry 901, and/or the receiving unit 902 may be configured to receive configuration data indicating whether the UE 10 should skip backoff behaviour or not, wherein skipping backoff behaviour means transmitting the preamble on the selected beam being different than the beam of the RAR without performing a backoff operation indicated in the RAR. E.g. receiving configuration data indicating whether the UE 10 should skip backoff behaviour or not, e.g. in the RAR or as configuration signaling. Thus, the configuration data may be received in the RAR. The configuration data may be indicating whether the UE 10 should skip backoff behaviour or not for specific RACH access events, or specific services which trigger a RACH access. The configuration data may be indicated by a value of one or two bits, such as a flag bit.

The UE 10 may comprise a transmitting unit 903, e.g. a transmitter, a transceiver or module. The UE, the processing circuitry 901, and/or the transmitting unit 903 is configured to transmit the preamble e.g. the previously transmitted preamble or another preamble, in a selected beam, wherein the selected beam is selected based on the indicator. The UE, the processing circuitry 901, and/or the transmitting unit 903 may be configured to transmit the first preamble in the first beam during the random access procedure, wherein the first beam is different than the selected beam when the indicator in the RAR indicates that a load of the first beam is above a threshold.

The UE 10 may comprise a selecting unit 904. The UE, the processing circuitry 901, and/or the selecting unit 904 may be configured to select the selected beam based on the indicator. The UE, the processing circuitry 901, and/or the selecting unit 904 may be configured to select a different beam to use than the first beam based on measured signal strength or quality of beams.

The UE 10 further comprises a memory 905. The memory comprises one or more units to be used to store data on, such as signal strengths or qualities, IDs of radio network nodes, preambles, RAR information, indicators, applications to perform the methods disclosed herein when being executed, and similar.

The UE 10 may further comprise a communication interface such as transmitter, receiver, transceiver and/or one or more antennas.

The methods according to the embodiments described herein for the UE 10 are respectively implemented by means of e.g. a computer program product 906 or a computer program, comprising instructions, i.e., software code portions, which, when executed on at least one processor, cause the at least one processor to carry out the actions described herein, as performed by the UE 10. The computer program product 906 may be stored on a computer-readable storage medium 907, e.g. a disc, a universal serial bus (USB) stick or similar. The computer-readable storage medium 907, having stored thereon the computer program product, may comprise the instructions which, when executed on at least one processor, cause the at least one processor to carry out the actions described herein, as performed by the UE 10. In some embodiments, the computer-readable storage medium may be a transitory or a non-transitory computer-readable storage medium. Thus, the UE 10 may comprise the processing circuitry and the memory, said memory comprising instructions executable by said processing circuitry whereby said UE is operative to perform the methods herein.

Figure 10:
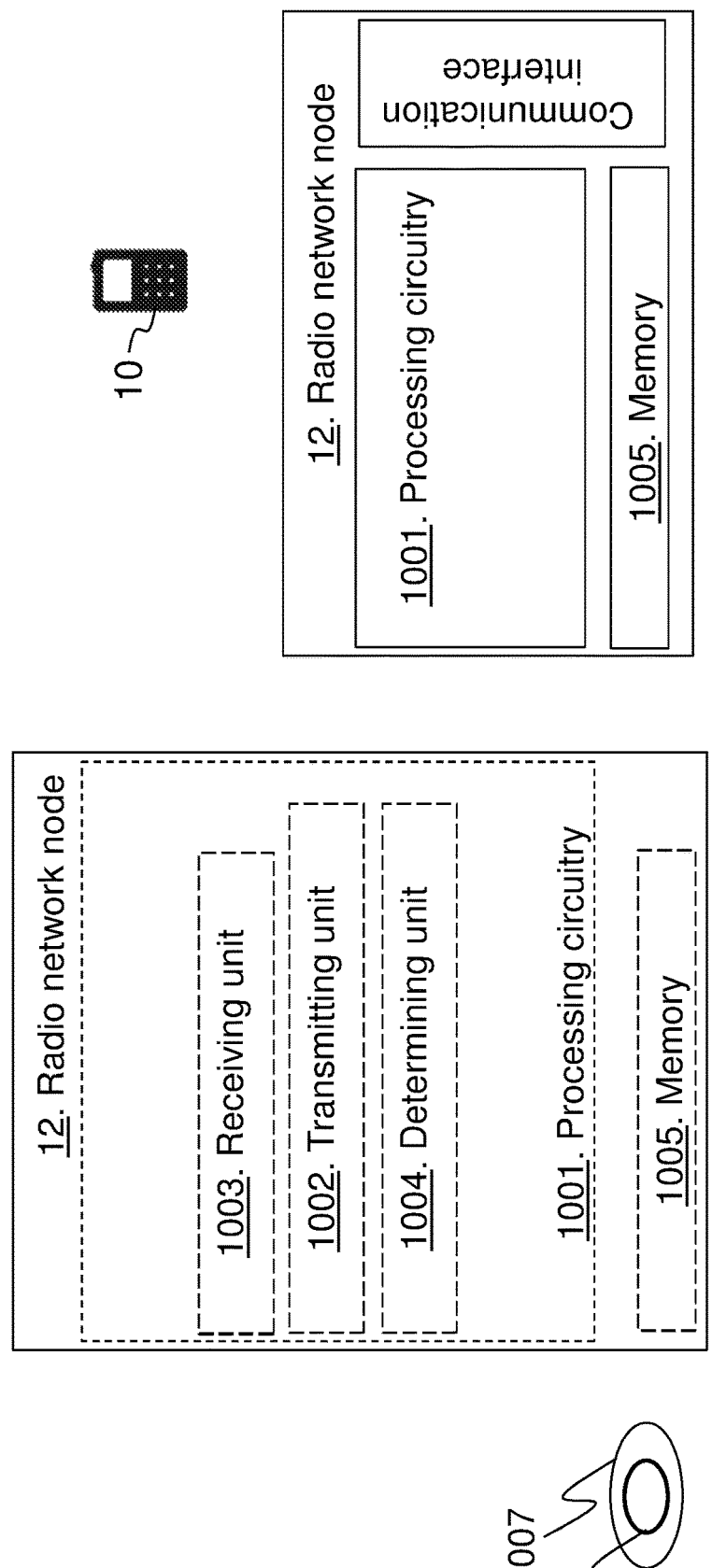
FIG. 10 is a block diagram depicting a radio network node according to embodiments herein.

FIG. 10 is a block diagram depicting the radio network node 12, such as a gNB, for handling communication of the UE 10 in the wireless communication network 1 according to embodiments herein.

The radio network node 12 may comprise processing circuitry 1001, such as one or more processors, configured to perform methods herein.

The radio network node 12 may comprise a transmitting unit 1002, e.g. a transmitter, a transceiver or module. The radio network node 12, the processing circuitry 1001, and/or the transmitting unit 1002 is configured to transmit configuration data to the UE 10, wherein the configuration data indicates whether the UE 10 should skip backoff behaviour or not and thereby indicating whether the UE 10, without performing a backoff operation indicated in the RAR, should change beam to transmit a preamble on or not. The configuration data may be signaled in a RAR of a random access procedure. The configuration data may be indicating whether the UE 10 should skip backoff behaviour or not for specific RACH access events, or specific services which trigger a RACH access. The configuration data may be indicated by a value of one or two bits, such as a flag bit.

The radio network node 12 may comprise a receiving unit 1003, e.g. a receiver, a transceiver or module. The radio network node 12, the processing circuitry 1001, and/or the receiving unit 1003 may be configured to receive the first preamble from the UE 10 in the first beam during a random access procedure, e.g. the preamble from the UE, which preamble is associated with a beam. The radio network node 12 may comprise a determining unit 1004. The radio network node 12, the processing circuitry 1001, and/or the determining unit 1004 may be configured to obtain a load of the first beam served by the radio network node 12 e.g.

determine load of beams and to determine whether the beam (first beam) associated to the preamble is overloaded, i.e. over the threshold. The radio network node 12, the processing circuitry 1001, and/or the transmitting unit 1002 may be configured to transmit the RAR comprising the indicator indicating the obtained load of the first beam e.g. transmit the indicator to the UE 10, which indicator indicates that the first beam is overloaded. The radio network node 12, the processing circuitry 1001, and/or the receiving unit 1003 may be configured to receive the first preamble or another preamble in the selected beam which is different than the first beam.

The radio network node 12 further comprises a memory 1005. The memory comprises one or more units to be used to store data on, such as signal strengths or qualities, IDs of radio network nodes, loads of beams, preambles, RAR information, indicators, applications to perform the methods disclosed herein when being executed, and similar.

The radio network node 12 may further comprise a communication interface such as transmitter, receiver, transceiver and/or one or more antennas.

The methods according to the embodiments described herein for the radio network node 12 are respectively implemented by means of e.g. a computer program product 1006 or a computer program, comprising instructions, i.e., software code portions, which, when executed on at least one processor, cause the at least one processor to carry out the actions described herein, as performed by the radio network node 12. The computer program product 1006 may be stored on a computer-readable storage medium 1007, e.g. a disc, a universal serial bus (USB) stick or similar. The computer-readable storage medium 1007, having stored thereon the computer program product, may comprise the instructions which, when executed on at least one processor, cause the at least one processor to carry out the actions described herein, as performed by the radio network node 12. In some embodiments, the computer-readable storage medium may be a transitory or a non-transitory computer-readable storage medium. Thus, the radio network node 12 may comprise the processing circuitry and the memory, said memory comprising instructions executable by said processing circuitry whereby said radio network node is operative to perform the methods herein.

In some embodiments a more general term "radio network node" is used and it can correspond to any type of radio-network node or any network node, which communicates with a UE and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term UE or user equipment (UE) is used and it refers to any type of UE communicating with a network node and/or with another UE in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

The embodiments are described for 5G or NR. However the embodiments are applicable to any RAT or multi-RAT systems, where the UE receives and/or transmit signals (e.g. data) e.g. Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a UE or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Figure 11:
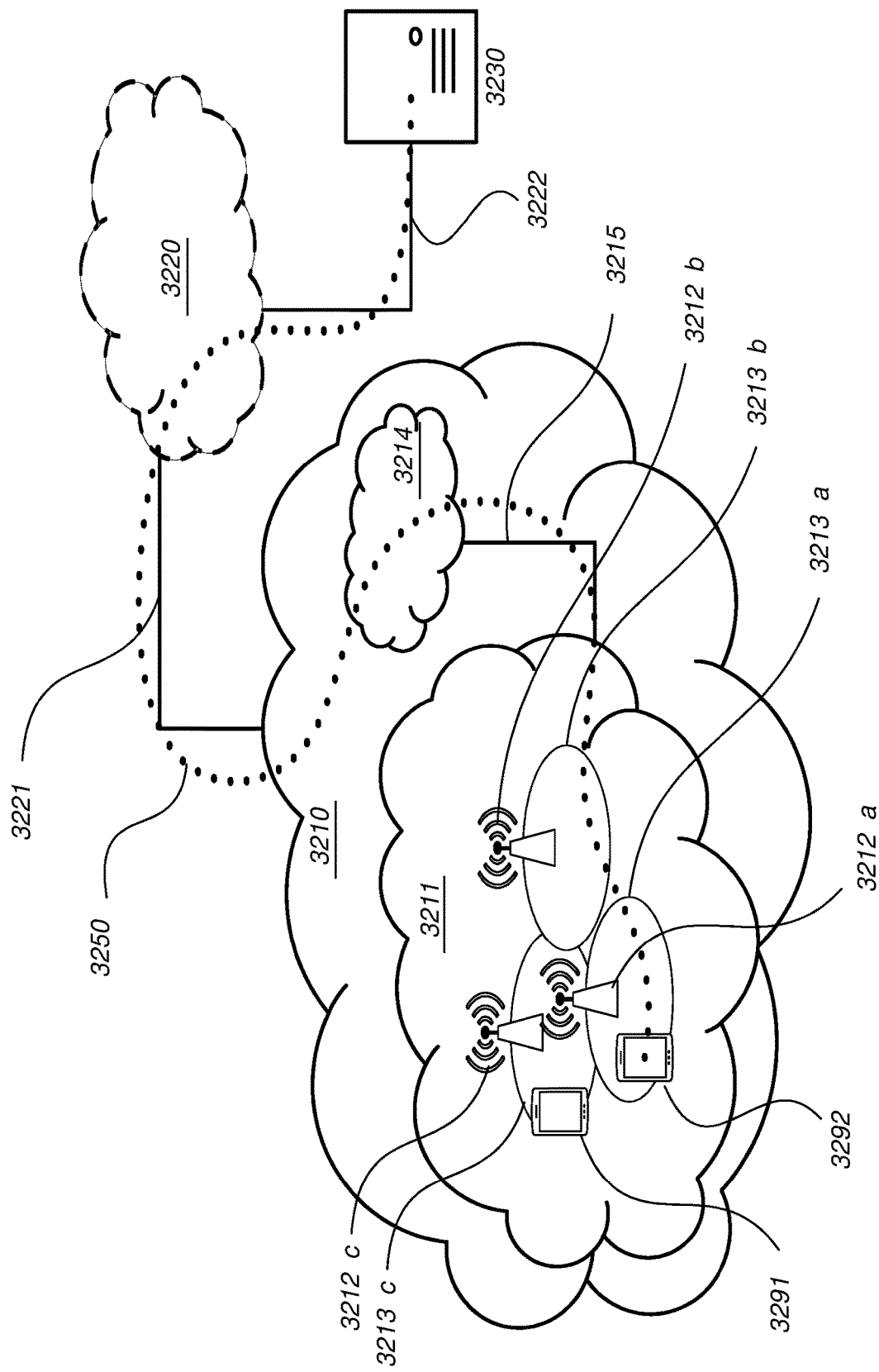
FIG. 11 shows a telecommunication network connected via an intermediate network to a host computer in accordance with some embodiments.

With reference to FIG. 11, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network node 12 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the UE 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 11 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 12. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 33 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 12) served by the base station 3320. The communication interface 3326 may be configured to facilitate a connection 3360 to the host computer 3310. The connection 3360 may be direct or it may pass through a core network (not shown in FIG. 12) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 12:
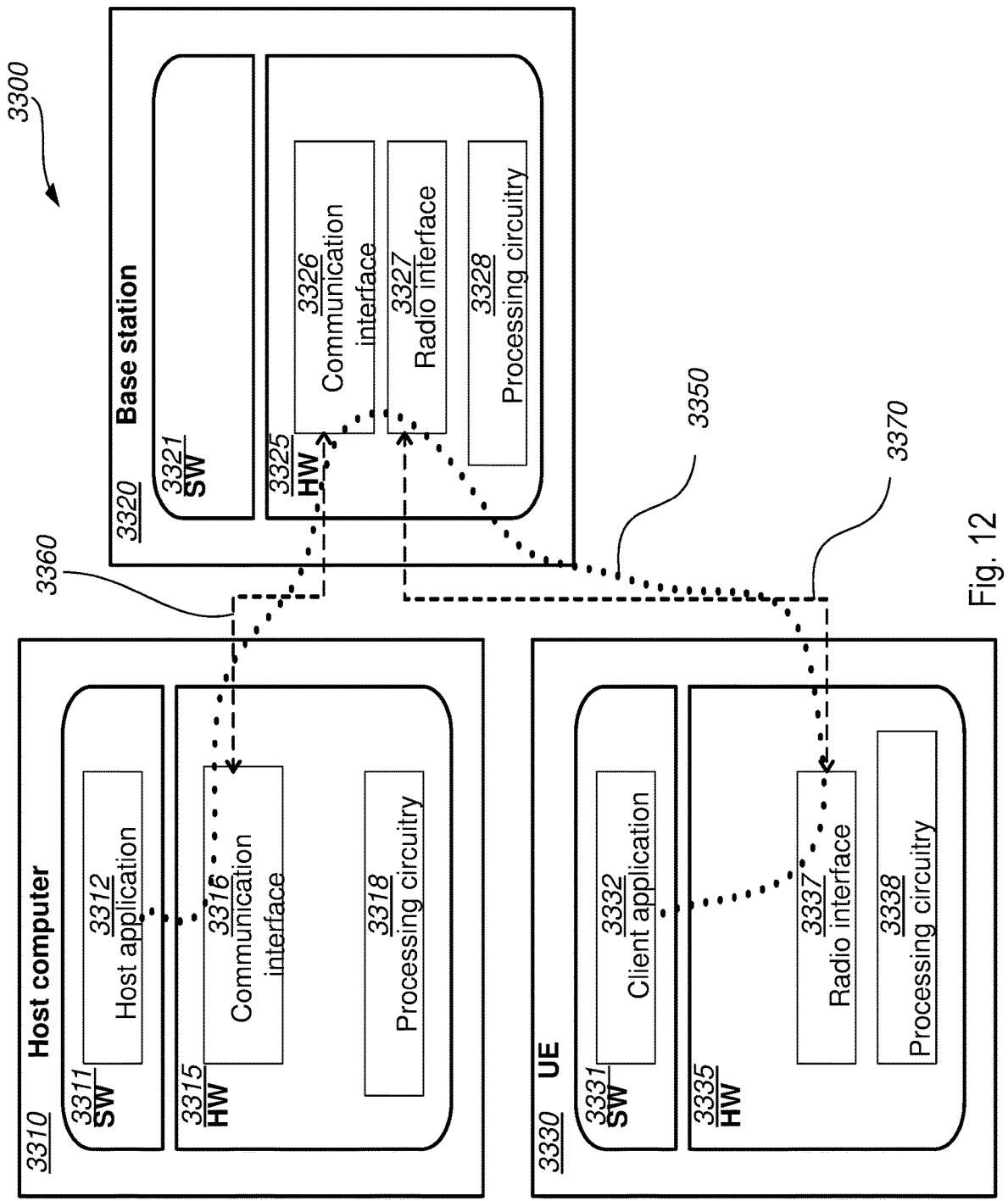
FIG. 12 shows a host computer communicating via a base station with a user equipment over a partially wireless connection in accordance with some embodiments.

It is noted that the host computer 3310, base station 3320 and UE 3330 illustrated in FIG. 12 may be identical to the host computer 3230, one of the base stations 3212a, 3212b, 3212c and one of the UEs 3291, 3292 of FIG. 11, respectively. This is to say, the inner workings of these entities may be as shown in FIG. 12 and independently, the surrounding network topology may be that of FIG. 11.

In FIG. 12, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the latency since the UE may use a beam not overloaded and thereby provide benefits such as reduced waiting time and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 15:
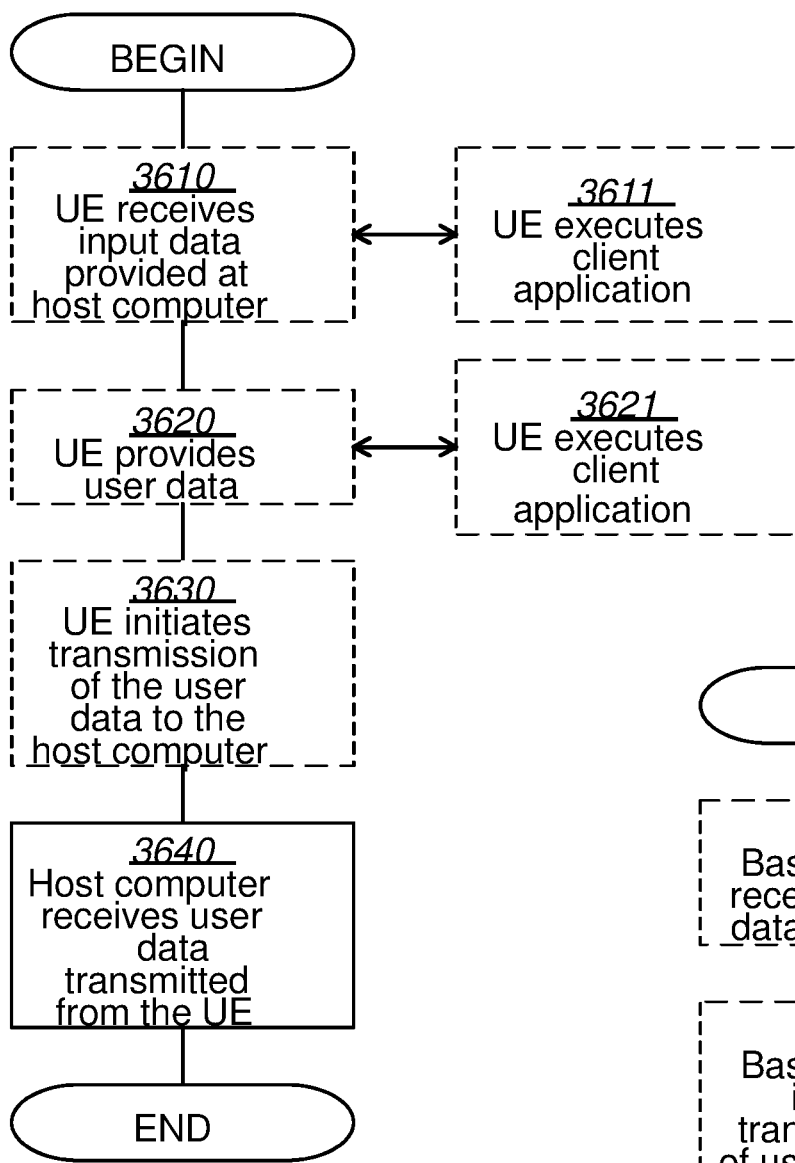
FIG. 15 shows methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 16:
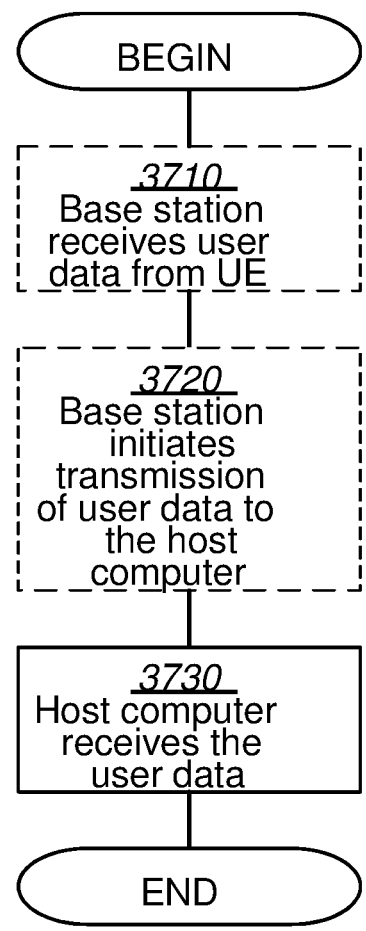
FIG. 16 shows methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station. Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a user equipment, UE, for handling communication in a wireless communication network, the method comprising:
receiving configuration data that indicates that, for one or more certain random access channel, RACH, access events or for one or more certain services which trigger a RACH access event, the UE should skip backoff behavior on a currently used beam and should change beam from the currently used beam to a currently non-used beam;

transmitting, on a first beam, a random access preamble for a random access procedure that is for one of the one or more certain RACH access events or triggered by one of the one or more certain services;

receiving a random access response, RAR, for the random access procedure, wherein the RAR comprises a backoff indicator BI, indicating that a load of the first beam is above a threshold; and responsive to receiving the configuration data and receiving the BI in the RAR for the random access procedure being for one of the one or more certain RACH access events or triggered by one of the one or more certain services, transmitting a random access preamble in a second beam that is different than the first beam without performing a backoff operation.

2. The method according to claim 1 further comprising: selecting the second beam by the UE based on the BI.

3. The method according to claim 1, wherein the configuration data is received in the RAR.

4. The method according to claim 1, wherein the configuration data is indicated by a value of one or two bits.

5. The method according to claim 1 wherein the one or more certain RACH access events and the one or more certain services that trigger a RACH access event are sensitive to latencies.

6. A method performed by a radio network node for handling communication of a user equipment, UE, in a wireless communication network, the method comprising:

transmitting configuration data to the UE, wherein the configuration data indicates that, for one or more certain random access channel, RACH, access events or for one or more certain services which trigger a RACH access event, whether the UE should skip backoff behaviour or not and thereby indicating whether the UE, without performing a backoff operation indicated in a random access response, RAR, should change beam to transmit a preamble on or not for the one or more certain RACH access events or for the one or more certain services which trigger a RACH access event.

7. The method according to claim 6, wherein the configuration data is signaled in the RAR of a random access procedure.

8. The method according to claim 6, wherein the configuration data is indicated by a value of one or two bits.

9. The method according to claim 6, further comprising:

receiving a first preamble from the UE in a first beam during a random access procedure that is for one of the one or more certain RACH access events or triggered by one of the one or more certain services;

obtaining a load of the first beam served by the radio network node;

transmitting the RAR, comprising an indicator indicating the obtained load of the first beam; and receiving the first preamble or another preamble in a second beam for one of the one or more certain RACH access events or triggered by one of the one or more certain services, wherein the second beam is different than the first beam.

10. The method according to claim 6 wherein the one or more certain RACH access events and the one or more certain services that trigger a RACH access event are sensitive to latencies.

11. A user equipment, UE, for handling communication in a wireless communication network, comprising:

a memory; and processing circuitry configured to cause the UE to:

receive configuration data that indicates that, for one or more certain random access channel, RACH, access events or for one or more certain services which trigger a RACH access event, the UE should skip backoff behavior on a currently used beam and should change beam from the currently used beam to a currently non-used beam;

transmit, on a first beam, a random access preamble for a random access procedure that is for one of the one or more certain RACH access events or triggered by one of the one or more certain services;

receive a random access response, RAR, for the random access procedure, wherein the RAR comprises a backoff indicator, BI, indicating that a load of the first beam is above a threshold;

responsive to receiving the configuration data and receiving the BI in the RAR for the random access procedure being for one of the one or more certain RACH access events or triggered by one of the one or more certain services, transmit a random access preamble in a second beam that is different than the first beam without performing a backoff operation.

12. The UE according to claim 11, wherein the UE is further configured to:

select the second beam based on the BI.

13. The UE according to claim 11, wherein the configuration data is received in the RAR.

14. The UE according to claim 11, wherein the configuration data is indicated by a value of one or two bits.

15. A radio network node for handling communication of a user equipment, UE, in a wireless communication network, the radio network node comprising:

a memory; and processing circuitry configured to cause the radio network node to:

transmit configuration data to the UE, wherein the configuration data indicates that for one or more certain random access channel, RACH, access events or for one or more certain services which trigger a RACH access event, whether the UE should skip backoff behaviour or not and thereby indicating whether the UE, without performing a backoff operation indicated in a random access response, RAR, should change beam to transmit a preamble on or not for the one or more certain RACH access events or for the one or more certain services which trigger a RACH access event.

16. The radio network node according to claim 15, wherein the configuration data is signaled in the RAR of a random access procedure.

17. The radio network node according to claim 15, wherein the configuration data is indicated by a value of one or two bits.

18. The radio network node according to claim 15, wherein the radio network node is further configured to:

receive a first preamble from the UE in a first beam during a random access procedure that is for one of the one or more certain RACH access events or triggered by one of the one or more certain services;

obtain a load of the first beam served by the radio network node;

transmit the RAR, comprising an indicator indicating the obtained load of the first beam; and receive the first preamble or another preamble in a second beam one of the one or more certain RACH access events or triggered by one of the one or more certain services, wherein the second beam is different than the first beam.

* * * * *